US012131729B2

(12) United States Patent
Masumura et al.

(10) Patent No.: US 12,131,729 B2
(45) Date of Patent: Oct. 29, 2024

(54) LANGUAGE MODEL SCORE CALCULATING APPARATUS, LEARNING APPARATUS, LANGUAGE MODEL SCORE CALCULATING METHOD, LEARNING METHOD AND PROGRAM (71) Applicant: NIPPON TELEGRAPH AND TELEPHONE CORPORATION, Tokyo (JP)

(72) Inventors: Ryo Masumura, Tokyo (JP); Tomohiro Tanaka, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 552 days.

(21) Appl. No.: 17/268,578

(22) PCT Filed: Jun. 21, 2019

(86) PCT No.: PCT/JP2019/024799
§ 371 (c)(1),
(2) Date: Feb. 15, 2021

(87) PCT Pub. No.: WO2020/035998
PCT Pub. Date: Feb. 20, 2020

(65) Prior Publication Data
US 2021/0174788 A1 Jun. 10, 2021

(30) Foreign Application Priority Data
Aug. 17, 2018 (JP) .................................. 2018-153495

(51) Int. Cl.
G10L 15/16 (2006.01)
G10L 15/07 (2013.01)
G10L 15/197 (2013.01)

(52) U.S. Cl.
CPC .............. G10L 15/16 (2013.01); G10L 15/07 (2013.01); G10L 15/197 (2013.01)

(58) Field of Classification Search
CPC ....... G10L 15/16; G10L 15/07; G10L 15/197; G06F 40/279; G06F 40/30; G06N 3/044; G06N 7/01
(Continued)

(56) References Cited

U.S. PATENT DOCUMENTS 8,620,655 B2 * 12/2013 Xu .......................... G10L 15/065
704/250
9,715,496 B1 * 7/2017 Sapoznik ................ H04L 51/02
(Continued)

OTHER PUBLICATIONS

Mikolov, Tomas, et al., "Recurrent Neural Network Based Language Model," Interspeech 2010, pp. 1045-1048.
(Continued)

Primary Examiner — Thuykhanh Le (57) ABSTRACT

A language model score calculation apparatus calculates a prediction probability of a word $w_i$ as a language model score of a language model based on a recurrent neural network. The language model score calculation apparatus includes a memory; and a processor configured to execute converting a word $w_{i-1}$ that is observed immediately before the word $w_i$ into a word vector $\phi(w_{i-1})$; converting a speaker label $r_{i-1}$ corresponding to the word $w_{i-1}$ and a speaker label $r_i$ corresponding to the word $w_i$ into a speaker vector $\psi(r_{i-1})$ and a speaker vector $\psi(r_i)$, respectively; calculating a word history vector $s_i$ by using the word vector $\phi(w_{i-1})$, the speaker vector $\psi(r_{i-1})$, and a word history vector $s_{i-1}$ that is obtained when a prediction probability of the word $w_{i-1}$ is calculated; and calculating a prediction probability of the word $w_i$ by using the word history vector $s_{i-1}$ and the speaker vector $\psi(r_i)$.

8 Claims, 5 Drawing Sheets (58) Field of Classification Search
USPC .......................................................... 704/240
See application file for complete search history.

(56) References Cited

U.S. PATENT DOCUMENTS

| | | | | |
|---|---|---|---|---|
| 10,210,860 B1* | 2/2019 | Ward | ..................... | G06N 3/044 |
| 10,303,769 B2* | 5/2019 | Zorzin | ................. | G06F 40/232 |
| 10,402,658 B2* | 9/2019 | Min | ....................... | G06V 20/52 |
| 10,629,186 B1* | 4/2020 | Slifka | ................ | G10L 15/1815 |
| 10,650,306 B1* | 5/2020 | Kumar | ................ | G06N 3/047 |
| 10,923,111 B1* | 2/2021 | Fan | ........................ | G10L 15/16 |
| 10,984,034 B1* | 4/2021 | Sandland | .............. | G10L 15/183 |
| 11,024,297 B2* | 6/2021 | Aravamudan | ...... | G10L 15/1822 |
| 11,250,319 B1* | 2/2022 | Huang | .................. | G06N 3/047 |
| 2002/0123891 A1* | 9/2002 | Epstein | ................ | G10L 15/197 |
| | | | | 704/235 |
| 2002/0143525 A1* | 10/2002 | Lewis | .................. | G10L 15/197 |
| | | | | 704/E15.044 |
| 2008/0300853 A1* | 12/2008 | Xiaoning | ............. | G06F 3/0237 |
| | | | | 704/10 |
| 2009/0124234 A1* | 5/2009 | Fisher | ................ | H04W 12/068 |
| | | | | 455/406 |
| 2010/0324899 A1* | 12/2010 | Yamabana | .............. | G10L 15/07 |
| | | | | 704/270.1 |
| 2014/0104175 A1* | 4/2014 | Ouyang | ............. | G06F 3/04886 |
| | | | | 345/168 |
| 2014/0140497 A1* | 5/2014 | Ripa | ................... | H04M 3/5175 |
| | | | | 379/265.06 |
| 2014/0344945 A1* | 11/2014 | Buer | ....................... | G06F 21/73 |
| | | | | 726/26 |
| 2014/0365880 A1* | 12/2014 | Bellegarda | ........ | G06F 16/90324 |
| | | | | 715/261 |
| 2015/0095026 A1* | 4/2015 | Bisani | .................... | H04R 3/005 |
| | | | | 704/232 |
| 2015/0100524 A1* | 4/2015 | Pantel | .................... | G06N 20/00 |
| | | | | 706/12 |
| 2016/0135700 A1* | 5/2016 | Gregg | ................... | G06F 40/166 |
| | | | | 715/780 |
| 2016/0217124 A1* | 7/2016 | Sarikaya | ............... | G06F 40/274 |
| 2017/0221486 A1* | 8/2017 | Kurata | .................... | G10L 13/00 |
| 2017/0236511 A1* | 8/2017 | Zhao | ........................ | G10L 15/19 |
| | | | | 704/240 |
| 2017/0262949 A1* | 9/2017 | Jay | ......................... | G06Q 10/10 |
| 2017/0270092 A1* | 9/2017 | He | ........................ | G06F 3/0482 |
| 2017/0270919 A1* | 9/2017 | Parthasarathi | .......... | G10L 17/06 |
| 2018/0068229 A1* | 3/2018 | Srinivasan | ............. | G06Q 50/10 |
| 2018/0144265 A1* | 5/2018 | Bonawitz | ................. | G06N 7/06 |
| 2018/0182376 A1* | 6/2018 | Van Gysel | ............. | G10L 21/10 |
| 2018/0204120 A1* | 7/2018 | Rei | .......................... | G06N 3/04 |
| 2018/0267952 A1* | 9/2018 | Osborne | ................. | G06F 40/10 |
| 2018/0285778 A1* | 10/2018 | Nori | ...................... | G06F 18/254 |
| 2018/0315438 A1* | 11/2018 | Davies | .................... | G10L 25/60 |
| 2019/0043490 A1* | 2/2019 | Rivlin | ................... | G10L 15/197 |
| 2019/0115029 A1* | 4/2019 | Kracun | ................... | G10L 15/22 |
| 2019/0205383 A1* | 7/2019 | Martineau | .............. | G06N 3/006 |
| 2019/0243900 A1* | 8/2019 | Gan | ........................ | G06F 40/30 |
| 2019/0377794 A1* | 12/2019 | Li | .......................... | G06F 40/30 |
| 2019/0392823 A1* | 12/2019 | Li | ............................ | G06N 3/08 |
| 2020/0152207 A1* | 5/2020 | Wang | ....................... | G10L 17/18 |
| 2020/0382451 A1* | 12/2020 | Ogawa | .................... | G06F 3/015 |
| 2021/0019478 A1* | 1/2021 | Matsuoka | ............... | G06F 40/51 |
| 2021/0174788 A1* | 6/2021 | Masumura | .............. | G10L 15/16 |

OTHER PUBLICATIONS

Sundermeyer, Martin, et al., "LSTM Neural Networks for Language Modeling," Interspeech 2012, Sep. 9-13, 2012.

* cited by examiner

LANGUAGE MODEL SCORE CALCULATING APPARATUS, LEARNING APPARATUS, LANGUAGE MODEL SCORE CALCULATING METHOD, LEARNING METHOD AND PROGRAM

CROSS-REFERENCE TO RELATED APPLICATIONS

This application is a U.S. 371 Application of International Patent Application No. PCT/JP2019/024799, filed on 21 Jun. 2019, which application claims priority to and the benefit of JP Application No. 2018-153495, filed on 17 Aug. 2018, the disclosures of which are hereby incorporated herein by reference in their entireties.

TECHNICAL FIELD

The present invention relates to a language model score calculation apparatus, a learning apparatus, a language model score calculation method, a learning method, and a program.

BACKGROUND ART

In speech recognition, machine translation, or the like, a language model is needed for performing linguistic predictions. The language model can calculate language model scores (for example, a prediction probability of a word, etc.) that represent linguistic likelihood, and the performance thereof decides the performance of speech recognition, machine translation, or the like. While various kinds of language models have been proposed so far, in recent years, a language model based on a recurrent neural network (RNN) has attracted attention (for example, see NPL 1 and 2). This recurrent neural network based language model has very high language prediction performance and is actively used in speech recognition, machine translation, or the like.

The recurrent neural network based language model can learn from text data. When learning from text data that corresponds to a target task, the recurrent neural network based language model can achieve high language prediction performance. The learning of the recurrent neural network based language model refers to updating of a model parameter (namely, a parameter of the recurrent neural network) by leaning.

When predicting a current word $w_i$ under the condition that a word sequence $w_1, \ldots, w_{i-1}$ has been observed, the recurrent neural network based language model receives an immediately preceding word $w_{i-1}$ and an output $s_{i-1}$ immediately preceding an intermediate layer as inputs, the recurrent neural network based language model outputs probability distribution of a prediction probability $P(w_i|w_{i-1}, s_{i-1}, \theta)$ of the current word $w_i$. In this prediction probability P, θ is a model parameter of the recurrent neural network based language model. The prediction probability P is a language model score.

Since a word sequence $w_1, \ldots, w_{i-2}$ which includes all the words up to the (i−2)th word is embedded in the output $s_{i-1}$ in the intermediate layer, the recurrent neural network based language model can calculate the prediction probability $P(w_i|w_{i-1}, s_{i-1}, \theta)$ of the current word $w_i$, namely, the language model score, by explicitly using long-term word history information. Hereinafter, an output $S_i$ in the intermediate layer is also referred to as "word history vector". There are various kinds of recurrent neural networks that can be used as the recurrent neural network based language model. For example, various recurrent neural networks such as an LSTM (Long Short-Term Memory) and a GRU (Gated Recurrent Unit) can be used.

CITATION LIST

Non Patent Literature

[NPL 1] Mikolov Tomas, Karafiat Martin, Burget Lukas, Cernocky Jan, Khudanpur Sanjeev, "Recurrent neural network based language model", INTERSPEECH 2010, pp. 1045-1048, 2010.
[NPL 2] Martin Sundermeyer, Ralf Schluter, and Hermann Ney, "LSTM Neural Networks for Language Modeling", INTERSPEECH 2012.

SUMMARY OF THE INVENTION

Technical Problem

However, since the conventional recurrent neural network based language model does not take speakers into account, its use has been assumed for, for example, speech recognition of a single speaker. Therefore, with the conventional recurrent neural network based language model, a prediction probability of a current word (namely, a language model score of the recurrent neural network based language model) cannot be calculated by explicitly using information such as who has spoken what and who is going to speak next in a conversation etc. among a plurality of people.

With the foregoing in view, it is an object of an embodiment of the present invention to calculate a language model score taking speakers into account.

Means for Solving the Problem

To achieve the above object, according to the embodiment of the present invention, there is provided a language model score calculation apparatus that calculates a prediction probability of a word $w_i$ as a language model score of a language model based on a recurrent neural network, the language model score calculation apparatus including: word vector representation means for converting a word $w_{i-1}$ that is observed immediately before the word $w_i$ into a word vector $\phi(w_{i-1})$; speaker vector representation means for converting a speaker label $r_{i-1}$ corresponding to the word $w_{i-1}$ and a speaker label $r_i$ corresponding to the word $w_{i-1}$ into a speaker vector $\psi(r_{i-1})$ and a speaker vector $\psi(r_i)$, respectively; word history vector representation means for calculating a word history vector $s_i$ by using the word vector $\phi(w_{i-1})$, the speaker vector $\psi(r_{i-1})$, and a word history vector $s_{i-1}$ that is obtained when a prediction probability of the word $w_{i-1}$ is calculated; and prediction probability calculation means for calculating a prediction probability of the word $w_i$ by using the word history vector $s_{i-1}$ and the speaker vector $\psi(r_i)$.

Effects of the Invention

A language model score taking speakers into account can be calculated.

DESCRIPTION OF EMBODIMENTS

Hereinafter, an embodiment of the present invention will be described in detail with reference to the drawings. In the embodiment of the present invention, a language model score calculation apparatus 10 that calculates a language model score taking speakers into account in a recurrent neural network based language model will be described. Also, in the embodiment of the present invention, a model parameter learning apparatus 20 that learns a model parameter $\theta$ of the recurrent neural network based language model, which can calculate a language model score taking speakers into account, will be described.

Generally, contents of speech vary depending on gender, a role, etc. of a speaker. For example, when a prediction probability of a word to be spoken next in a dialog between an operator in a call center and a customer is calculated, if a word sequence that has been spoken by each of the operator and the customer can explicitly be observed and if it is known whether a target to be observed is the operator or the customer, more sophisticated prediction of the next word to be spoken can be expected.

Namely, when predicting a word that the operator is going to speak next, for example, it can be expected that the operator is going to speak a word based on a speech style that has been used by the operator and that the operator is going to speak a word that corresponds to the immediately preceding word spoken by the customer. Therefore, by calculating a language model score taking speakers into account, more sophisticated word prediction can be performed.

The language model score calculation apparatus 10 according to the embodiment of the present invention explicitly introduces speaker information to the recurrent neural network based language model so that a language model score taking speakers into account is calculated. Speaker information refers to a speaker label that represents a speaker who has spoken a word or a speaker who is going to speak a word. Hereinafter, a speaker who has spoken a word $w_i$ or a speaker who is going to speak a word $w_i$ is represented by a speaker label $r_i$. For example, when a prediction probability of the i-th word $w_i$ is calculated, speakers who have spoken a word sequence $w_1, \ldots, w_{i-1}$ that has been observed are represented by a speaker label sequence $r_1, \ldots, r_{i-1}$, and a speaker who is going to speak a word $w_i$ is represented by a speaker label $r_i$.

<Functional Configuration of Language Model Score Calculation Apparatus 10>

Figure 1:
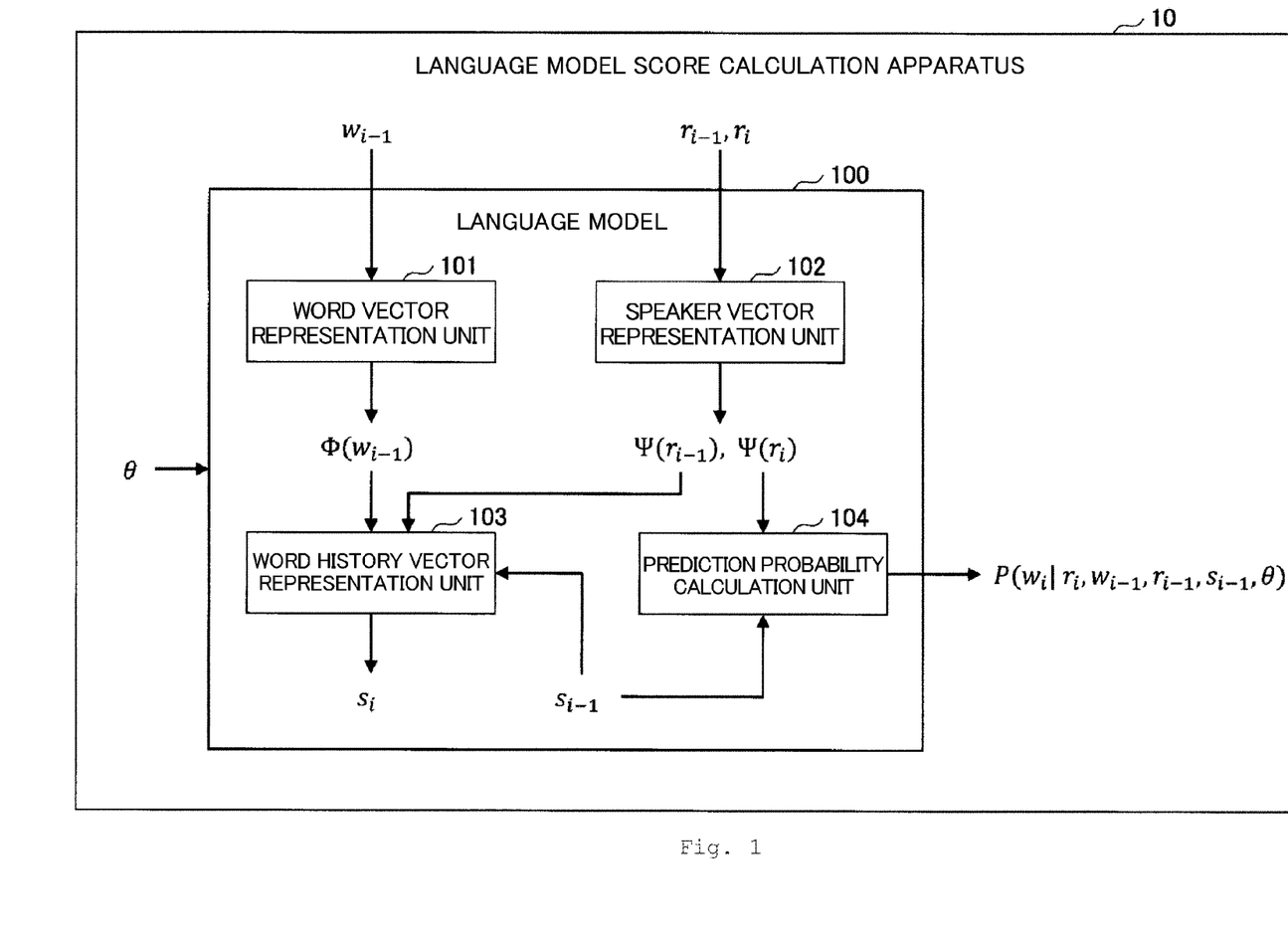
FIG. 1 illustrates an example of a functional configuration of a language model score calculation apparatus according to an embodiment of the present invention.

First, a functional configuration of the language model score calculation apparatus 10 according to the embodiment of the present invention will be described with reference to FIG. 1. FIG. 1 illustrates an example of a functional configuration of the language model score calculation apparatus 10 according to the embodiment of the present invention.

As illustrated in FIG. 1, the language model score calculation apparatus 10 according to the embodiment of the present invention includes a language model 100 based on a recurrent neural network. This language model 100 is implemented by at least one recurrent neural network. As the recurrent neural network, various kinds of recurrent neural networks, such as an LSTM and a GRU, can be used.

The language model 100 receives, as inputs, a word $w_{i-1}$, a speaker label $r_{i-1}$ that corresponds to the word $w_{i-1}$, a speaker label $r_i$ that corresponds to a word $w_i$, a word history vector $s_{i-1}$, and a model parameter $\theta$ and outputs probability distribution of a prediction probability $P(w_i | r_i, w_{i-1}, r_{i-1}, s_{i-1}, \theta)$ of the word $w_i$ (namely, a prediction probability distribution of the word $w_i$). In this operation, the language model 100 of the language model score calculation apparatus 10 uses a model parameter $\theta$ that has been learned by a model parameter learning apparatus 20. This prediction probability $P(w_i | r_i, w_{i-1}, r_{i-1}, s_{i-1}, \theta)$ is a language model score of the language model 100. However, the language model score is not limited to this example. A value based on this prediction probability $P(w_i | r_i, w_{i-1}, r_{i-1}, s_{i-1}, \theta)$ (for example, a value obtained by taking a natural logarithm of the prediction probability $P(w_i | r_i, w_{i-1}, r_{i-1}, s_{i-1}, \theta)$) may serve as a language model score.

A value of the speaker label $r_i$ can be determined based on channels or the like of voice inputs. For example, in a case in which there are two channels, which are channel A and channel B, a value of the speaker label $r_i$ corresponding to the word $w_i$ included in the voice input from the channel A can be determined to be "1", and a value of the speaker label $r_i$ corresponding to the word $w_i$ included in the voice input from the channel B can be determined to be "2". Alternatively, for example, as preprocessing to be performed before the word $w_i$ is input to the language model 100, the speaker label $r_i$ may be acquired by any speaker label determiner.

The language model 100 includes a word vector representation unit 101, a speaker vector representation unit 102, a word history vector representation unit 103, and a prediction probability calculation unit 104 as the functional units.

When a prediction probability distribution of the word $w_i$ is calculated, the word vector representation unit 101 receives, as inputs, a word $w_{i-1}$ and a model parameter $\theta$ and outputs a word vector $\phi(w_{i-1})$. Namely, the word vector representation unit 101 converts the word $w_{i-1}$ into the word vector $\phi(w_{i-1})$ in accordance with the model parameter $\theta$.

For example, as the word vector $\phi(w_{i-1})$, it is possible to adopt a one-hot vector in which only the element of a dimension corresponding to the word $w_{i-1}$ is set to 1 and the elements other than that are set to 0. For example, the one-hot vector is discussed in the above NPL 1. Alternatively, for example, a method in which linear conversion is performed on the one-hot vector could be adopted. For example, an example of the linear conversion performed on the one-hot vector is discussed in the above NPL 2.

When a prediction probability distribution of the word $w_i$ is calculated, the speaker vector representation unit 102 receives, as inputs, a speaker label $r_{i-1}$ and the model parameter $\theta$ and outputs a speaker vector $\psi(r_{i-1})$. In addition, the speaker vector representation unit 102 receives, as inputs, a speaker label $r_i$ and the model parameter $\theta$ and outputs a speaker vector $\psi(r_i)$. Namely, the speaker vector representation unit 102 converts speaker labels $r_{i-1}$ and $r_i$ into speaker vectors $\psi(r_{i-1})$ and $\psi(r_i)$, respectively, in accordance with the model parameter $\theta$.

For example, as the speaker vector $(r_{i-1})$, it is possible to adopt a one-hot vector in which only the element of a dimension corresponding to the speaker label $r_{i-1}$ is set to 1 and the elements other than that are set to 0. The same applies to the speaker vector $\psi(r_i)$. For example, the one-hot vector is discussed in the above NPL 1. Alternatively, for example, a method in which linear conversion is performed on the one-hot vector could be adopted. For example, an example of the linear conversion performed on the one-hot vector is discussed in the above NPL 2.

When a prediction probability distribution of the word $w_i$ is calculated, the word history vector representation unit 103 receives, as inputs, the word vector $\phi(w_{i-1})$, the speaker vector $\psi(r_{i-1})$, a past word history vector $s_{i-1}$ and the model parameter $\theta$, and outputs a word history vector $s_i$. Namely, the word history vector representation unit 103 converts the word vector $\phi(w_{i-1})$, the speaker vector $\psi(r_{i-1})$, and the past word history vector $s_{i-1}$ into the word history vector $s_i$ in accordance with the model parameter $\theta$. In this operation, the word history vector representation unit 103 generates a vector (hereinafter, referred to as "concatenated vector") in which the word vector $\phi(w_{i-1})$ and the speaker vector $\psi(r_{i-1})$ are concatenated. Next, the word history vector representation unit 103 performs conversion processing on this concatenated vector based on the recurrent neural network so that the word history vector representation unit 103 can output the word history vector $s_i$. For example, the conversion processing based on the recurrent neural network is discussed in the above NPLs 1 and 2.

For example, if the dimensionality of the word vector $\phi(w_{i-1})$ is 200 and the dimensionality of the speaker vector $\psi(r_{i-1})$ is 64, the concatenated vector is represented by a 264-dimensional vector. In addition, the past word history vector $s_{i-1}$ is calculated through recursive processing performed by the word history vector representation unit 103. A past word history vector $s_0$ used when a prediction probability distribution of the word $w_i$ is calculated may be a vector whose elements are all set to zero.

The prediction probability calculation unit 104 receives, as inputs, the past word history vector $s_{i-1}$, the speaker vector $\psi(r_i)$, and the model parameter $\theta$, and outputs a prediction probability distribution of the word $w_i$. Namely, the prediction probability calculation unit 104 outputs probability distribution of a prediction probability $P(w_i|r_i, w_{i-1}, r_{i-1}, s_{i-1}, \theta)$ of the word $w_i$ based on the past word history vector $s_{i-1}$ and the speaker vector $\psi(r_i)$ in accordance with the model parameter $\theta$. The prediction probability calculation unit 104 can obtain the prediction probability distribution of the word $w_i$ by performing conversion using a softmax function. For example, the conversion using a softmax function is discussed in the above NPLs 1 and 2.

The prediction probability distribution of the word $w_i$ output by the above operation can be used in speech recognition, for example. Specifically, for example, based on the prediction probability of the word $w_i$, scoring is performed on the top M ($\geq 1$) speech recognition hypotheses output from a speech recognition system so that the speech recognition hypotheses are rescored. For example, the rescoring is performed by using a score obtained by adding a score that is output from the speech recognition system and a score that is the natural logarithm of this prediction probability.

<Functional Configuration of Model Parameter Learning Apparatus 20>

Figure 2:
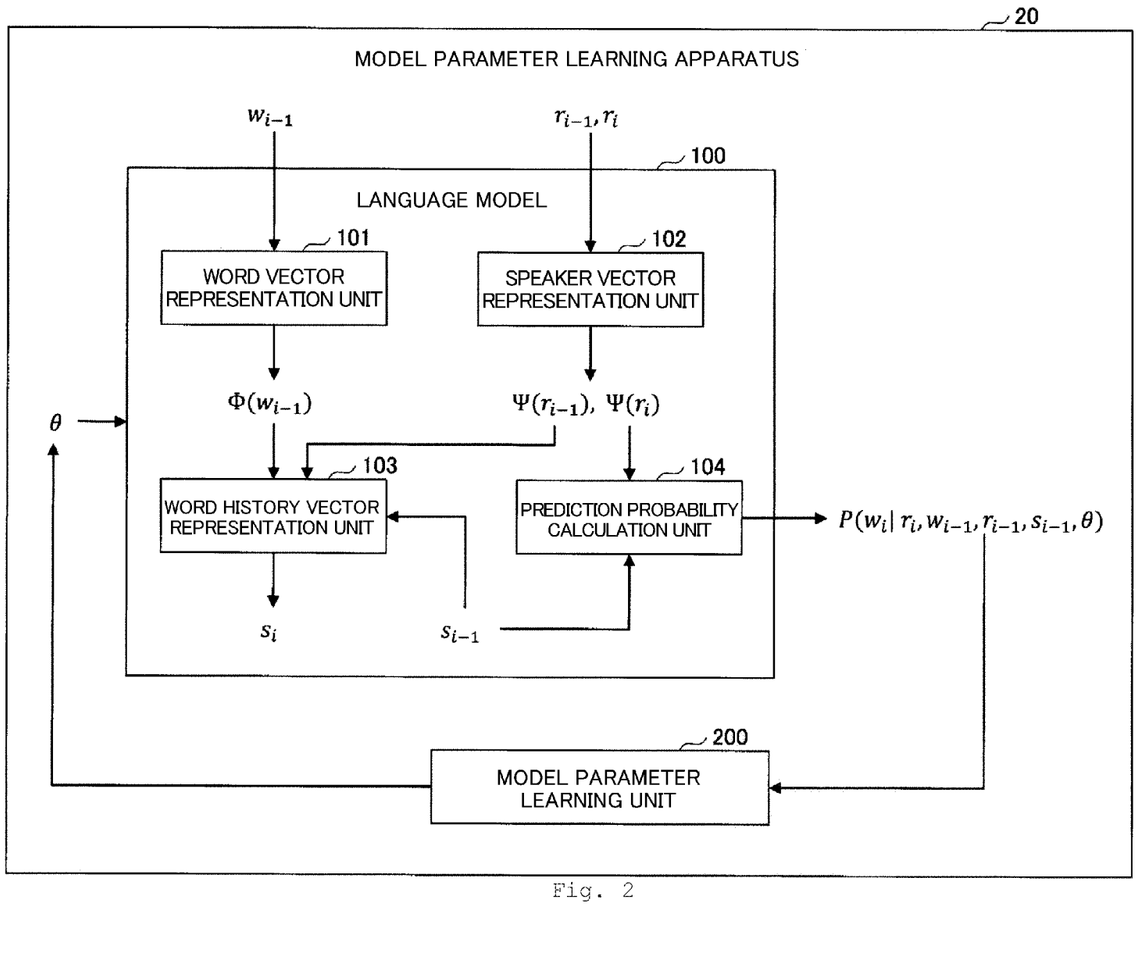
FIG. 2 illustrates an example of a functional configuration of a model parameter calculation apparatus according to the embodiment of the present invention.

Next, a function configuration of the model parameter learning apparatus 20 according to the embodiment of the present invention will be described with reference to FIG. 2. FIG. 2 illustrates an example of a functional configuration of the model parameter learning apparatus 20 according to the embodiment of the present invention.

As illustrated in FIG. 2, the model parameter learning apparatus 20 according to the embodiment of the present invention includes a language model 100 and a model parameter learning unit 200. Since the language model 100 is the same as that described above, detailed description thereof will be omitted. However, the language model 100 of the model parameter learning apparatus 20 outputs prediction probability distributions of words $w_i$ based on a model parameter $\theta$ that has not yet been learned.

the language model 100 receives, as inputs, a word sequence $w_1, \ldots, w_N$ and a speaker label sequence $r_1, \ldots, r_N$, and outputs prediction probability distributions of the respective words $w_i$ by using a model parameter $\theta$ that has not yet been learned. Namely, the language model 100 receives, as inputs, words $w_{i-1}$ in sequence from i=1 to i=N, a speaker label $r_i$, and a speaker label $r_{i-1}$ and outputs prediction probability distributions of the respective words $w_i$. In this way, prediction probability distributions of the word $w_i$ to the word $w_N$, respectively, can be obtained. The word sequence $w_1, \ldots, w_N$ and the speaker label sequence $r_1, \ldots, r_N$ are, for example, the word sequence and the speaker label sequence from which conversation data among a plurality of persons has been generated.

The model parameter learning unit 200 receives, as inputs, the word sequence $w_1, \ldots, w_N$ and the prediction probability distributions of the respective words $w_i$, which have been output from the language model 100, updates the model parameter $\theta$ based on the inputs, and outputs the updated model parameter $\theta$. In this way, the model parameter $\theta$ is learned.

In this operation, the model parameter learning unit 200 updates the model parameter $\theta$ to a value such that a likelihood function $L(\theta)$ expressed by formula (1) below is maximized.

[Formula 1]

$$L(\theta) = \prod_{i=1}^{N} P(w_i | r_i, w_{i-1}, r_{i-1}, s_{i-1}, \theta) \qquad (1)$$

In this formula, $P(w_i|r_i, w_{i-1}, r_{i-1}, s_{i-1}, \theta)$ is the prediction probability of the word $w_i$ in the input word sequence $w_1, \ldots, w_N$. For example, in a case where the word $w_i$ can be "word 1", "word 2", or "word 3", if the i-th word $w_i$ in the input word sequence is "word 2", $P(w_i|r_i, w_{i-1}, r_{i-1}, s_{i-1}, \theta)$ is the prediction probability of the word "word 2", namely, $P(\text{word } 2|r_i, w_{i-1}, r_{i-1}, s_{i-1}, \theta)$. Therefore, the model parameter $\theta$ that maximizes the likelihood function $L(\theta)$ expressed by formula (1) above means a model parameter with which a prediction probability $P(w_i|r_i, w_{i-1}, r_{i-1}, s_{i-1}, \theta)$ of a correct word $w_i$ (namely, the i-th word $w_i$ in the input word sequence) is maximized.

Thus, the model parameter learning unit 200 can estimate argmax $L(\theta)$ and use this estimated value as an updated model parameter $\theta$. Various methods can be used as the method for estimating the model parameter $\theta$ that maximizes the likelihood function $L(\theta)$. The examples of such a method include a back propagation method.

In the embodiment of the present invention, while the language model score calculation apparatus 10 and the model parameter learning apparatus 20 have been described as different apparatuses, this configuration is merely an example. The language model score calculation apparatus 10 and the model parameter learning apparatus 20 may be the same apparatus, for example.

<Method for Calculating Prediction Probability Distribution>

Figure 3:
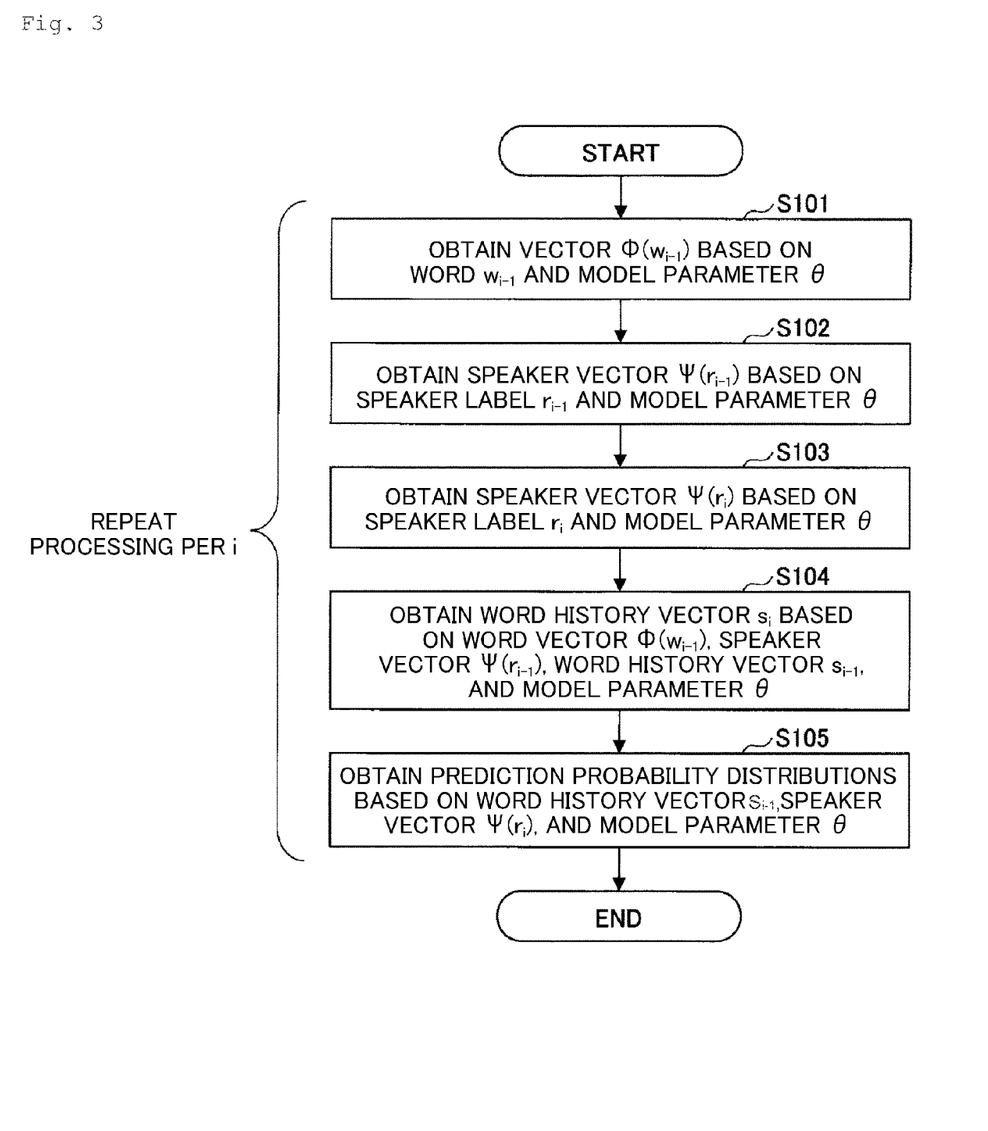
FIG. 3 is a flowchart illustrating an example of processing for calculating a prediction probability distribution according to the embodiment of the present invention.

Next, processing in which the language model score calculation apparatus 10 according to the embodiment of the present invention calculates prediction probability distributions will be described with reference to FIG. 3. FIG. 3 is a flowchart illustrating an example of processing for calculating a prediction probability distribution according to the embodiment of the present invention. The language model score calculation apparatus 10 performs the processing of steps S101 to S105 in FIG. 3 for each i, which represents the index of an individual word, and repeats the processing in sequence from i=1. Hereinafter, a case in which a prediction probability distribution of a word $w_i$ is calculated will be described. The following description assumes that a model parameter θ has been learned in advance.

Step S101: The word vector representation unit 101 receives, as inputs, an immediately preceding word $w_{i-1}$ and the model parameter θ, and obtains a word vector $\phi(w_{i-1})$. Namely, the word vector representation unit 101 converts a word $w_{i-1}$ into a word vector $\phi(w_{i-1})$ in accordance with the model parameter θ.

Step S102: The speaker vector representation unit 102 receives, as inputs, a speaker label $r_{i-1}$ and the model parameter θ and obtains a speaker vector $\psi(r_{i-1})$. Namely, the speaker vector representation unit 102 converts a speaker label $r_{i-1}$ into a speaker vector $\psi(r_{i-1})$ in accordance with the model parameter θ.

Step S103: The speaker vector representation unit 102 receives, as inputs, a speaker label $r_i$ and the model parameter θ, and obtains a speaker vector $\psi(r_i)$. Namely, the speaker vector representation unit 102 converts a speaker label $r_i$ into a speaker vector $\psi(r_i)$ in accordance with the model parameter θ.

The above processing of steps S101 to S103 may be performed in random order. Alternatively, the above processing of step S101 may be performed in parallel with the above processing of step S102 or step S103. Still alternatively, the above processing of step S103 may be performed after the processing of step S104 described below has been performed.

Step S104: The word history vector representation unit 103 receives, as inputs, the word vector $\phi(w_{i-1})$, the speaker vector $\psi(r_{i-1})$, a past word history vector $s_{i-1}$, and the model parameter θ, and obtains a word history vector $s_i$. Namely, after generating a concatenated vector in which the word vector $\phi(w_{i-1})$ and the speaker vector $\psi(r_{i-1})$ are concatenated, the word history vector representation unit 103 converts the concatenated vector and the past word history vector $s_{i-1}$ into the word history vector $s_i$ in accordance with the model parameter θ.

Step S105: The prediction probability calculation unit 104 receives, as inputs, the past word history vector $s_{i-1}$, the speaker vector $\psi(r_i)$, and the model parameter θ, and obtains a prediction probability distribution of the word $w_i$. Namely, the prediction probability calculation unit 104 obtains probability distribution of a prediction probability $P(w_i|r_i, w_{i-1}, r_{i-1}, s_{i-1}, \theta)$ of the word $w_i$ based on the past word history vector $s_{i-1}$ and the speaker vector $\psi(r_i)$ in accordance with the model parameter θ.

In this way, for example, a prediction probability $P(w_i|r_i, w_{i-1}, r_{i-1}, s_{i-1}, \theta)$ of each of the words $w_i$ is obtained as a language model score of the language model 100. Since the individual prediction probability P is a language model score taking the speakers into account, more sophisticated word predictions can be performed based on such a language model score.

<Processing for Learning Model Parameters>

Figure 4:
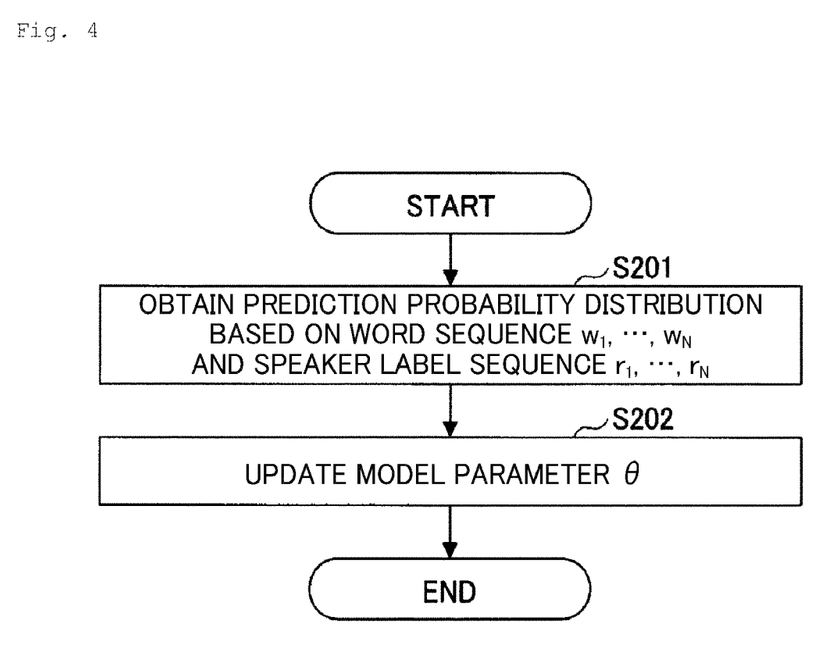
FIG. 4 is a flowchart illustrating an example of processing for learning a model parameter according to the embodiment of the present invention.

Next, processing in which the model parameter learning apparatus 20 according to the embodiment of the present invention learns a model parameter will be described with reference to FIG. 4. FIG. 4 is a flowchart illustrating an example of processing for learning a model parameter according to the embodiment of the present invention. The following description assumes that the model parameter θ has been initialized to, for example, an appropriate initial value.

Step S201: The language model 100 receives, as inputs, a word sequence $w_1, \ldots, w_N$ and a speaker label sequence $r_1, \ldots, r_N$, and outputs prediction probability distributions of words $w_i$ by using the model parameter θ that has not yet been learned. Namely, the language model 100 receives, as inputs, words $w_{i-1}$ in sequence from i=1 to i=N, speaker labels $r_i$, and speaker labels $r_{i-1}$, and outputs prediction probability distributions of the respective words $w_i$ by performing the above processing of steps S101 to S105. In this way, the respective prediction probability distributions of the word $w_i$ to the word $w_N$ can be obtained.

Step S202: Next, the model parameter learning unit 200 receives, as inputs, the word sequence $w_1, \ldots, w_N$ and the prediction probability distributions of the respective words w output from the language model 100, updates the model parameter θ based on the inputs, and outputs the updated model parameter θ. In this operation, the model parameter learning unit 200 updates the model parameter θ such that a likelihood function L(θ) expressed by formula (1) above is maximized. In this way, the model parameter θ is learned.

In a case where, for example, multiple sets of a word sequence $w_1, \ldots, w_N$ and a speaker label sequence $r_1, \ldots, r_N$ are provided, the above processing of steps S201 and S202 may be repeated for each set.

<Hardware Configuration of Language Model Score Calculation Apparatus 10 and Model Parameter Learning Apparatus 20>

Figure 5:
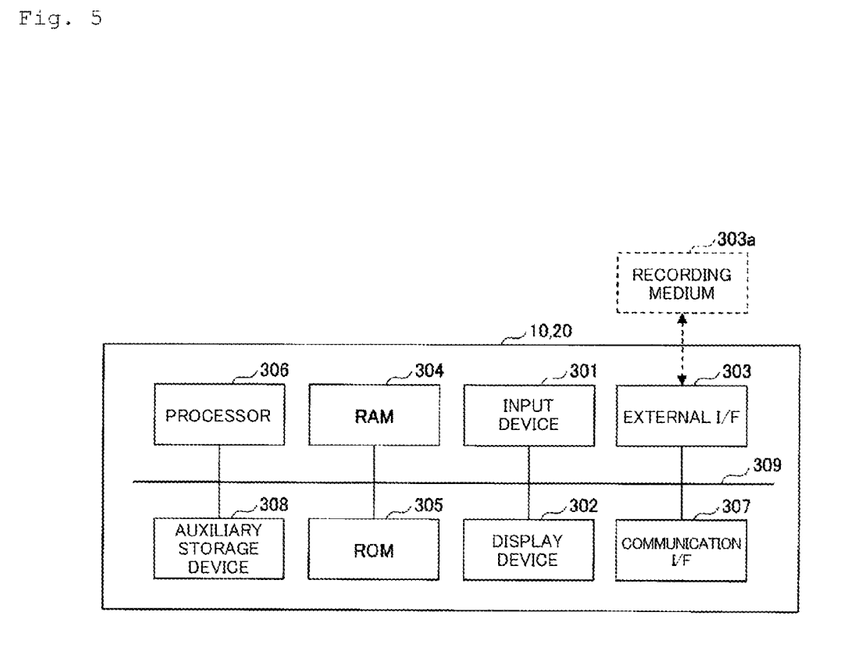
FIG. 5 illustrates an example of a hardware configuration of the language model score calculation apparatus and a model parameter learning apparatus.

Next, a hardware configuration of the language model score calculation apparatus 10 and the model parameter learning apparatus 20 according to the embodiment of the present invention will be described with reference to FIG. 5. FIG. 5 illustrates an example of a hardware configuration of the language model score calculation apparatus 10 and the model parameter learning apparatus 20 according to the embodiment of the present invention. Since the language model score calculation apparatus 10 and the model parameter learning apparatus 20 have substantially the same hardware configuration, the following description will be made mainly on the hardware configuration of the language model score calculation apparatus 10.

As illustrated in FIG. 5, the language model score calculation apparatus 10 according to the embodiment of the present invention includes an input device 301, a display device 302, an external I/F 303, a RAM (Random Access Memory) 304, a ROM (Read-Only Memory) 305, a processor 306, a communication I/F 307, and an auxiliary storage device 308. These hardware components are communicably connected with each other via a bus 309.

The input device 301 is, for example, a keyboard, a mouse, a touch panel, or the like and is used for inputting various user operations. The display device 302 is, for example, a display or the like and displays results of processing performed by the language model score calculation apparatus 10. The language model score calculation apparatus 10 and the model parameter learning apparatus 20 may be provided with at least one of the input device 301 and the display device 302.

The external I/F 303 is an interface between the language model score calculation apparatus 10 and an external device. The external device includes a recording medium 303a or the like. The language model score calculation apparatus 10 can read from and write to the recording medium 303a or the like via the external I/F 303. In the recording medium 303a, at least one program that implements the language model 100 and the model parameter learning unit 200, a model parameter θ, etc. may be recorded.

Examples of the recording medium 303a include a flexible disk, a CD (Compact Disc), a DVD (digital Versatile Disk), an SD memory card (Secure Digital memory card), and a USB (Universal Serial Bus) memory card.

The RAM 304 is a volatile semiconductor memory that temporarily holds programs and data. The ROM 305 is a non-volatile semiconductor memory that can hold programs and data even after the power is turned off. The ROM 305 stores, for example, setting information on the OS (Operating System), setting information on a communication network, or the like.

The processor 306 is, for example, a CPU (Central Processing Unit), a GPU (Graphics Processing Unit), or the like. The processor 306 is a calculation apparatus that reads programs and data from the ROM 305, the auxiliary storage device 308, or the like into the RAM 304 and perform processing. The language model 100 and the model parameter learning unit 200 are implemented when at least one program stored in the auxiliary storage device 308 is executed by the processor 306, for example. The language model score calculation apparatus 10 and the model parameter learning apparatus 20 may include both the CPU and the GPU or may include either the CPU or the GPU, as the processor 306.

The communication I/F 307 is an interface for connecting the language model score calculation apparatus 10 to the communication network. At least one program for implementing the language model 100 and the model parameter learning unit 200 may be acquired (downloaded) from a predetermined server or the like via the communication I/F 307.

The auxiliary storage device 308 is a non-volatile storage device such as an HDD (Hard Disk Drive) or an SSD (Solid State Drive) to store programs and data. Examples of the programs and data stored in the auxiliary storage device 308 include an OS, an application program, at least one program for implementing the language model 100 and the model parameter learning unit 200, and the model parameter θ.

The language model score calculation apparatus 10 and the model parameter learning apparatus 20 according to the embodiment of the present invention can implement the various processing described above by having the hardware configuration illustrated in FIG. 5. In the hardware configuration illustrated in FIG. 5, the language model score calculation apparatus 10 is implemented by a single computer. However, the hardware configuration is not limited to this example. The language model score calculation apparatus 10 and the model parameter learning apparatus 20 may be implemented by a plurality of computers.

SUMMARY

As described above, the language model score calculation apparatus 10 according to the embodiment of the present invention can calculate a prediction probability of a word $w_i$, while taking speakers into account, as a language model score of the language model 100 based on a recurrent neural network, by using the speaker label $r_{i-1}$ that corresponds to the immediately preceding word $w_{i-1}$ and the speaker label $r_i$ that corresponds to the current word $w_i$. As a result, by using the language model score calculated by the language model score calculation apparatus 10 according to the embodiment of the present invention, more sophisticated word prediction can be performed.

The present invention is not limited to the above embodiment specifically disclosed, and various modifications and changes can be made without departing from the scope of the invention.

REFERENCE SIGNS LIST

10 Language model score calculation apparatus
20 Model parameter learning apparatus
100 Language model
101 Word vector representation unit
102 Speaker vector representation unit
103 Word history vector representation unit
104 Prediction probability calculation unit
200 Model parameter learning unit

The invention claimed is:

1. A language model score calculation apparatus that calculates a prediction probability of a word wi as a language model score of a language model based on a recurrent neural network, the language model score calculation apparatus comprising:
a memory; and
a processor configured to
receive, by the recurrent neural network, a word sequence in a conversation among a plurality of speakers, wherein the word sequence comprises a word $w_{i-1}$, and an immediately subsequent word $w_i$, the word $w_{i-1}$ corresponds to a speaker label $r_{i-1}$, wherein the recurrent neural network comprises a first intermediate layer, a second intermediate layer, a third intermediate layer, and a fourth intermediate layer, and the speaker label $r_{i-1}$ indicates a speaker of the plurality of speakers speaking the word $w_{i-1}$ in the word sequence in the conversation;
convert, by a first intermediate layer of the recurrent neural network, the word $w_{i-1}$ into a word vector $\Phi(w_{i-1})$ as a first intermediate output;
convert, by the second intermediate layer of the recurrent neural network, the speaker label $r_{i-1}$ corresponding to the word $w_{i-1}$ into a speaker vector $\omega(r_{i-1})$ and the speaker label $r_i$ corresponding to the word $w_i$ into a speaker vector $\omega(r_{i-1})$, respectively;
calculate, by the third intermediate layer of the recurrent neural network, a word history vector $s_i$ based on a set of the word vector $\Phi(w_{i-1})$, the speaker vector $\omega(r_{i-1})$, and a word history vector $s_{i-1}$, wherein the word history vector $s_{i-1}$ is based on outputs from the first and second intermediate layers of the recurrent neural network when a prediction probability of the word $w_{i-1}$ is previously calculated;
calculate, by the fourth intermediate layer of the recurrent neural network, a prediction probability of the word $w_{i-1}$, to be spoken by the speaker with the speaker label $r_{i-1}$ based on the word history $s_{i-1}$ and the speaker vector $\psi(r_i)$; and
cause an application to insert the word $w_{i-1}$ into the word sequence to be spoken by the speaker in the conversation among the plurality of speakers based on the prediction probability of the word $w_i$, the word $w_i$ predictably to be spoken by the speaker with speaker label $r_i$.

2. The language model score calculation apparatus according to claim 1, wherein, after the calculating of the word history vector generates the concatenated vector in which the word vector $\phi(w_{i-1})$ and the speaker vector $\psi(r_{i-1})$ are concatenated, the calculating of the word history vector calculates the word history vector $s_i$ based on the concatenated vector and the word history vector $s_{i-1}$.

3. The language model score calculation apparatus according to claim 1, wherein the speaker label $r_{i-1}$ is information indicating a speaker who has spoken the word $w_{i-1}$, and wherein the speaker label $r_i$ is information indicating a speaker who is going to speak the word $w_i$.

4. A learning apparatus for learning a model parameter θ of a language model based on a recurrent neural network, the learning apparatus comprising:
a memory; and
a processor configured to:
generate, by the recurrent neural network representing the language model, a prediction probability of word $w_i$ based a word sequence $w_i, \ldots, w_N$ as first training data and a speaker label sequence $r_i, \ldots, r_N$ as second training data respectively as input, and an initial model parameter θ of the recurrent neural network, wherein the speaker label sequence $r_i, \ldots, r_N$ represents a sequence of speakers of words in the word sequence $w_i, \ldots, w_N$, and in order i=1 to N, a prediction probability is generated for the word $w_i$ to $w_N$, and the language model predicts a prediction probability distribution of each of the word $w_i$ from a speaker vector $\psi(r_i)$ and a word history vector $s_{i-1}$;
train the recurrent neural network representing the language model by generating an updated model parameter θ based on the word sequence $w_i, \ldots, w_N$ and the prediction probability of each of the word $w_i$, wherein the updated model parameter θ maximizes a value e of likelihood function L(θ): and
further update the model parameter θ of the language model as at least a part of further training of the language model by using at least a word $w_i$ in the word sequence $w_i, \ldots, w_N$ and the prediction probability distribution of the word $w_i$, wherein the word $w_i$ in the word sequence $w_i, \ldots, w_N$ represents first ground truth data, the prediction probability distribution of the word $w_i$ in the word sequence $w_{i-1}, \ldots, w_N$ represents second ground truth data.

5. The learning apparatus according to claim 4, wherein the updating uses the individual words included in the word sequence $w_{i-1}, \ldots, w_N$ as correct words and updates the model parameter 0 such that while maximizing prediction probabilities of the correct words in individual prediction probability distributions, are maximized.

6. A language model score calculation method performed by a language model score calculation apparatus that includes a memory and a processor to calculate a prediction probability of a word $w_{i-1}$ as a language model score of a language model by a recurrent neural network, the language model score calculation method comprising:
receive, by the recurrent neural network, a word sequence in a conversation among a plurality of speakers, wherein the word sequence comprises a word $w_{i-1}$, and an immediately subsequent word $w_{i-1}$, the word $w_{i-1}$ corresponds to a speaker label $r_{i-1}$, wherein the recurrent neural network comprises a first intermediate layer, a second intermediate layer, a third intermediate layer, and a fourth intermediate layer, and the speaker label $r_{i-1}$ indicates a speaker of the plurality of speakers speaking the word $w_{i-1}$ in the word sequence in the conversation;
convert, by a first intermediate layer of the recurrent neural network, a word $w_{i-1}$ into the word vector $\phi(w_{i-1})$ as a first intermediate output;
convert, by the second intermediate layer of the recurrent neural network, the speaker label $r_{i-1}$ corresponding to the word $w_{i-1}$ into a speaker vector $\psi(r_{i-1})$ and a speaker label $r_i$ corresponding to the word $w_{i-1}$ into a speaker vector $\psi(r_i)$ respectively, wherein the speaker vector $\psi(r_{i-1})$ represents a second intermediate output, and the speaker vector $y(r_i)$ represents a third intermediate output;
calculate, by the third intermediate layer of the recurrent neural network, a word history vector $s_i$ based on a set of the word vector $\phi(w_{i-1})$, the speaker vector $w(r_{i-1})$, and a word history vector $s_{i-1}$, wherein the word history vector $s_{i-1}$ is based on outputs from the first and second intermediate layers of the recurrent neural network when a prediction probability of the word $w_{i-1}$ is previously calculated;
calculate, using by the fourth intermediate layer of the recurrent neural network, a prediction probability of the word $w_{i-1}$, to be spoken by the speaker with the speaker label $r_i$ based on the word history $s_{i-1}$ and the speaker vector $w(r_i)$; and
cause an application to insert the word $w_{i-1}$ into the word sequence to be spoken by the speaker in the conversation among the plurality of speakers based on the prediction probability of the word $w_i$, the word $w_i$ predictably to be spoken by the speaker with speaker label $r_i$.

7. A non-transitory computer-readable recording medium having computer-readable instructions stored thereon, which when executed, causes a computer including a memory and a processor to execute the language model score calculation method according to claim 6.

8. A language model score calculation apparatus that calculates a prediction score of a first word $w_{i-1}$ as a language model score of a language model based on a recurrent neural network, the language model score calculation apparatus comprising:
a memory; and
a processor configured to
calculate a first word history vector $s_i$ by:
receiving, by the recurrent neural network, a word sequence in a conversation among a plurality of speakers, wherein the word sequence comprises the first word $w_{i-1}$ and an immediately preceding second word $w_{i-1}$, the second word $w_{i-1}$ corresponds to a speaker label $r_{i-1}$, the recurrent neural network comprises a first intermediate layer, a second intermediate layer, and a third intermediate layer, and the speaker label $r_{i-1}$ indicates a speaker of the plurality of speakers speaking the second word $w_{i-1}$ in the word sequence in the conversation;
generating, by the first intermediate layer of the recurrent neural network, a second word vector $\phi(w_{i-1})$ of the second word $w_{i-1}$,
generating, by the second intermediate layer of the recurrent neural network, the second speaker vector $\psi(r_{i-1})$ of the second word $w_{i-1}$ according to a set of model parameters,
generating, by a combination of the first and second intermediate layers of the recurrent neural network, the second word history vector $s_{i-1}$ based on outputs from the first and second intermediate layers of the neural network when calculating a prediction score of the second word $w_{i-1}$, and generate, by the recurrent neural network, a prediction probability of the word $w_{i-1}$, to be spoken by the speaker with the speaker label $r_i$, wherein the recurrent neural network uses as input:

the second word history vector $s_{i-1}$; and a first speaker vector $\psi(r_i)$ of the first word $w_i$ as generated by the second intermediate layer of the recurrent neural network; and cause an application to insert the word $w_i$ into the word sequence to be spoken by the speaker in the conversation among the plurality of speakers based on the prediction probability of the word $w_i$, the word $w_i$ predictably to be spoken by the speaker with speaker label $r_i$.

* * * * *